(12) United States Patent
Smith et al.

(10) Patent No.: US 7,695,795 B1
(45) Date of Patent: Apr. 13, 2010

(54) FLUORINATED LACTIDE-BASED COPOLYMERS

(75) Inventors: Dennis W. Smith, Seneca, SC (US); Dahlia Haynes, Central, SC (US); Amit K. Naskar, Knoxville, TN (US)

(73) Assignee: Clemson University Research Foundation

( * ) Notice: Subject to any disclaimer, the term of this patent is extended or adjusted under 35 U.S.C. 154(b) by 0 days.

(21) Appl. No.: 12/044,403

(22) Filed: Mar. 7, 2008

Related U.S. Application Data

(60) Provisional application No. 60/894,025, filed on Mar. 9, 2007.

(51) Int. Cl.
*C08G 63/08* (2006.01)
(52) U.S. Cl. .......................... 428/98; 428/364; 525/450
(58) Field of Classification Search .................. 525/450; 428/98, 364; 606/231
See application file for complete search history.

(56) References Cited

U.S. PATENT DOCUMENTS

| | | | |
|---|---|---|---|
| 5,525,671 A * | 6/1996 | Ebato et al. .................... | 525/53 |
| 6,379,379 B1 * | 4/2002 | Wang ......................... | 623/1.15 |
| 2005/0142315 A1 | 6/2005 | DeSimone et al. | |
| 2008/0261043 A1 * | 10/2008 | Greiner et al. .............. | 428/398 |

FOREIGN PATENT DOCUMENTS

DE    10 2005 008 926.7    *    2/2005

OTHER PUBLICATIONS

Smith, D., Drews, M., Vasanathan, N.; Poly(lactic acid) Derived Fibers with Enhanced Performance, NTC Project: M04-CL07, Jun. 2005 [Online], accessed via the Internet [Retrieved on Apr. 21, 2009] URL:<http://www.ntcresearch.org/pdf-rpts/Bref0605/M04-CL07-05e.pdf>.*
Chen, W. et al.; Polym. Adv. Technol. 2003, 14, 245-253.*
Solvay-Solexis Fomblin Z Derivatives Product Data Sheet, Dec. 13, 2002 [Online], accessed via the Internet [Retrieved on Apr. 21, 2009] URL:<http://www.solvaysolexis.com/static//wma/pdf/5/4/3/4/fom_thin.pdf>.*
Yu, G., Ji, J., Zhu. H., Shen, J.; J. Bio. Mat. Res. Part B, 2005, 76B(1), p. 64-75.*
Xianhai Chen, et al; Synthesis and Characterization of [L]—Lactide-Ethylene Oxide Multiblock Copolymers; pp. 4295-4301; May 19, 1997; Macromolecules, 30 (15) 1997 (Abstract).
Product Data Sheet; Fluorolink Polymer Modifiers; pp. 1-5; Sep. 6, 2004; Solvay Solexis.
Albertsson, et al; Recent Developments in Ring Opening Polymerization of Lactones for Biomedical Applications; pp. 1466-1486; Jul. 18, 2003; Biomacromolecules 2003, 4.
Kaito, et al; Potentiation of the Activity of Bone Morphogenetic Protein-2 in Bone Regeneration by a PLA-PEG/Hydroxyapatite Composite; pp. 73-79; Feb. 3, 2004; Biomaterials; available online at ScienceDirect.com.
Sahoo, et al; Characterization of Porous PLGA/PLA Microparticles as a Scaffold for Three Dimensional Growth of Breast Cancer Cells; pp. 1132-1139; Nov. 19, 2004; Biomacromolecules 2005.
Barry, et al; Using Plasma Deposits to Promote Cell Population of the Porous Interior of Three-Dimensional Poly(D,L—Lactic Acid) Tissue-Engineering Scaffolds; pp. 1134-1140; Advanced Functional Materials 2005.
Wang, et al; A Method for Solvent-Free Fabrication of Porous Polymer Using Solid-State Foaming and Ultrasound for Tissue Engineering Applications; pp. 1924-1929; Oct. 10, 2005; Biomaterials; available on web at sciencedirect.com.
Yu, et al; Poly(D,L-Lactic Acid)—Block-(Ligand-Tethered Poly(Ethylene Glycol)) Copolymers as Surface Additives for Promoting Chondrocyte Attachment and Growth; pp. 64-75; Mar. 3, 2005; Department of Polymer Science and Engineering, Zhejiang University, Hangzhou 310027, China.
Karis, et al; Perfluoropolyether Characterization by Nuclear Magnetic Resonance Spectroscopy and Gel Permeation Chromatography; pp. 81-94; Jul. 25, 2002; Journal of Fluorine Chemistry 118 (2002).

* cited by examiner

*Primary Examiner*—David Wu
*Assistant Examiner*—Robert Jones, Jr.
(74) *Attorney, Agent, or Firm*—Dority & Manning, P.A.

(57) ABSTRACT

Disclosed is a process for producing lactide-based copolymers and the copolymers produced by this process. Disclosed copolymers are formed in one embodiment through the copolymerization of a lactide monomer with a fluorinated diol, for example a perfluorinated polyether monomer, oligomer or copolymer. The disclosed materials may display improved mechanical characteristics, hydrolytic characteristics, and thermal characteristics as compared to previously known lactide-based materials.

20 Claims, 13 Drawing Sheets

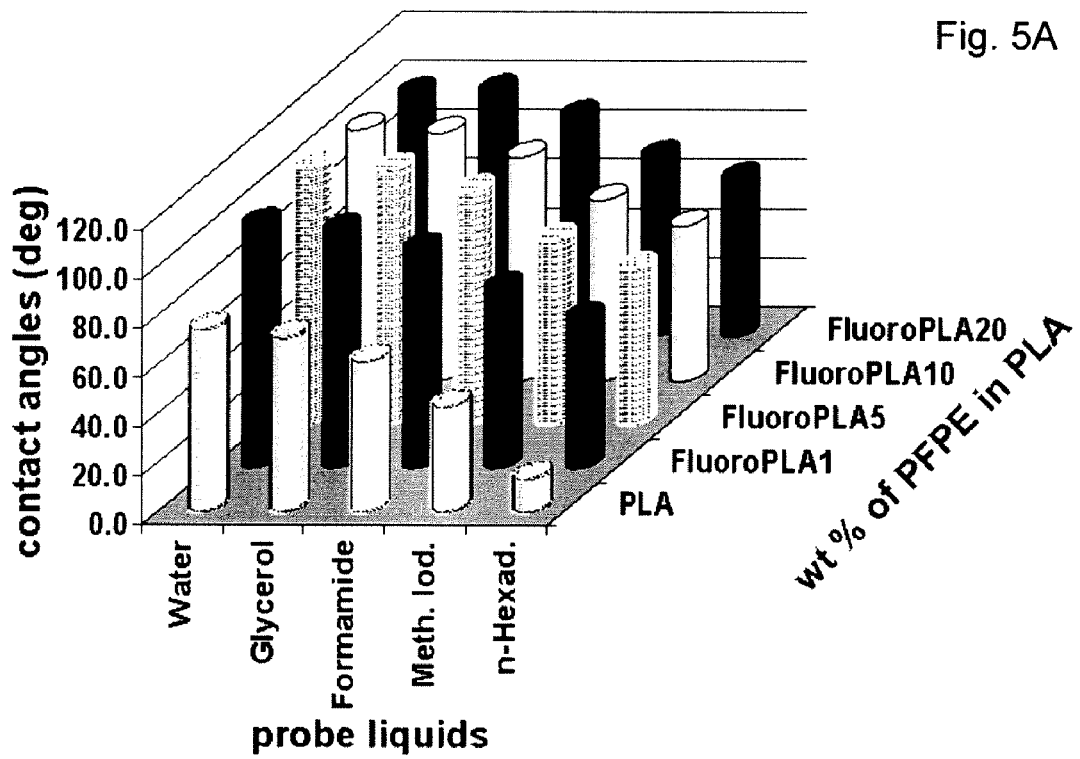
Fig. 5A
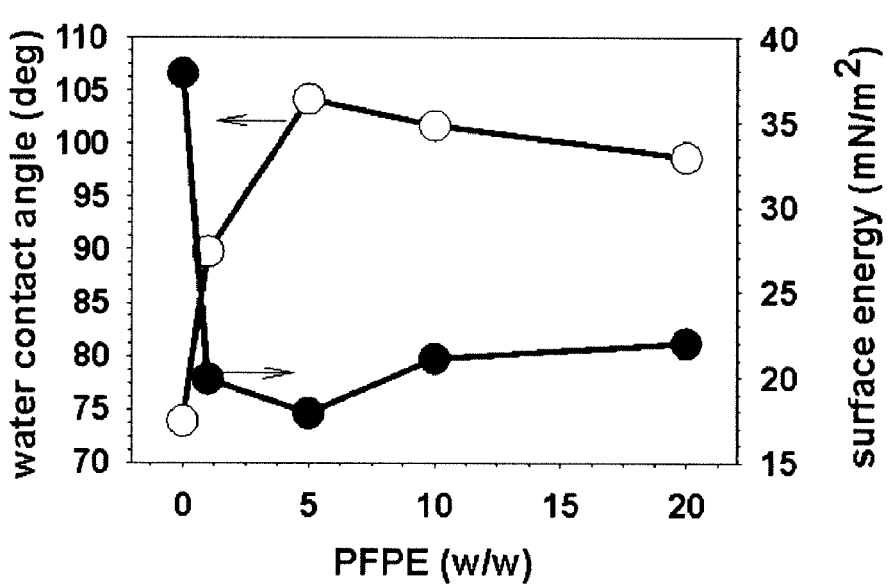
Fig. 5B
Fig. 5

Elution time (minutes)

FLUORINATED LACTIDE-BASED COPOLYMERS

CROSS REFERENCE TO RELATED APPLICATION

The present application claims filing benefit of U.S. Provisional Patent Application Ser. No. 60/894,025 having a filing date of Mar. 9, 2007, which is incorporated herein in its entirety.

BACKGROUND

The production of lactic acid-based polymers, specifically polylactic acid (PLA) polyesters, via ring opening polymerization of lactide monomer has been of interest for many years. The ring-opening polymerization of lactide has been studied extensively in hopes of producing useful bio-friendly polymeric materials from renewable resources (e.g., those that can be replenished through biomass production) as an alternative to materials that are based solely on non-renewable resources, e.g., petroleum-based materials.

Various approaches have been taken in an attempt to obtain lactide-based polymeric materials having desired product characteristics. For example, copolymerization with other materials and preparation of substituted polylactides have been examined. For instance, Chen, et al. have examined direct copolymerization of lactide with oxirane using a wide range of tin and aluminum based organometallic catalysts ('Synthesis and Characterization of [L]-Lactide-Ethylene Oxide Multiblock Copolymers', *Macromolecules,* 1997, 30 (15), 4295-4301).

Unfortunately, the copolymers obtained from such processes tend to have limited application. This has been due to both problematic processing characteristics as well as product characteristics. For instance, lactide-based polymers obtained to date have exhibited less than desirable mechanical properties, thermal properties, and water resistance than is necessary for many applications.

Fluorocarbons, in contrast, can offer many desirable characteristics to their incorporating materials. For instance, perfluoropolyethers (PFPEs), which are liquid fluoropolymers at room temperature, offer a variety of attractive properties including low surface energy, good oxidative stability, good solvent resistance, and high temperature resistance. PFPE has shown utility in medical applications due to the capability of forming PFPE films exhibiting high gas permeability and low permeability to a variety of bacterial agents. Unfortunately, however, fluorocarbons are also considered to be environmentally unfriendly.

What are needed in the art are polymeric materials that are more environmentally friendly and are also capable of displaying acceptable physical characteristics in many diverse fields of use.

SUMMARY

In one embodiment, disclosed are lactide-based fluorinated copolymers. More specifically, the polymer backbone of the copolymer includes an aliphatic ester that is an open lactide ring. In addition, the polymer backbone includes an aliphatic fluorinated ether. In one preferred embodiment, the copolymer can be a perfluorinated polyether.

Also disclosed are methods for forming the copolymers. For example, a method can include carrying out a ring opening polymerization of a lactide monomer in the presence of a fluorinated diol.

Also disclosed are formed polymeric products that can include the disclosed copolymer. For instance, disclosed copolymers can be melt-processed or solution processed, optionally with additives as are known in the art, to form fibers, films, coatings, and the like.

BRIEF DESCRIPTION OF THE FIGURES

A full and enabling disclosure of the presently disclosed subject matter, including the best mode thereof, to one of ordinary skill in the art, is set forth more particularly in the remainder of the specification, including reference to the accompanying figures, in which:

FIG. 5A illustrates the contact angles and surface energy for PLA and four different weight percentage PFPE/PLA copolymers with regard to several different probe liquids;

FIG. 5B summarizes trends detailing surface energy and water contact angles for PLA homopolymer and PFPE/PLA copolymers;

DETAILED DESCRIPTION

Figure 1A:
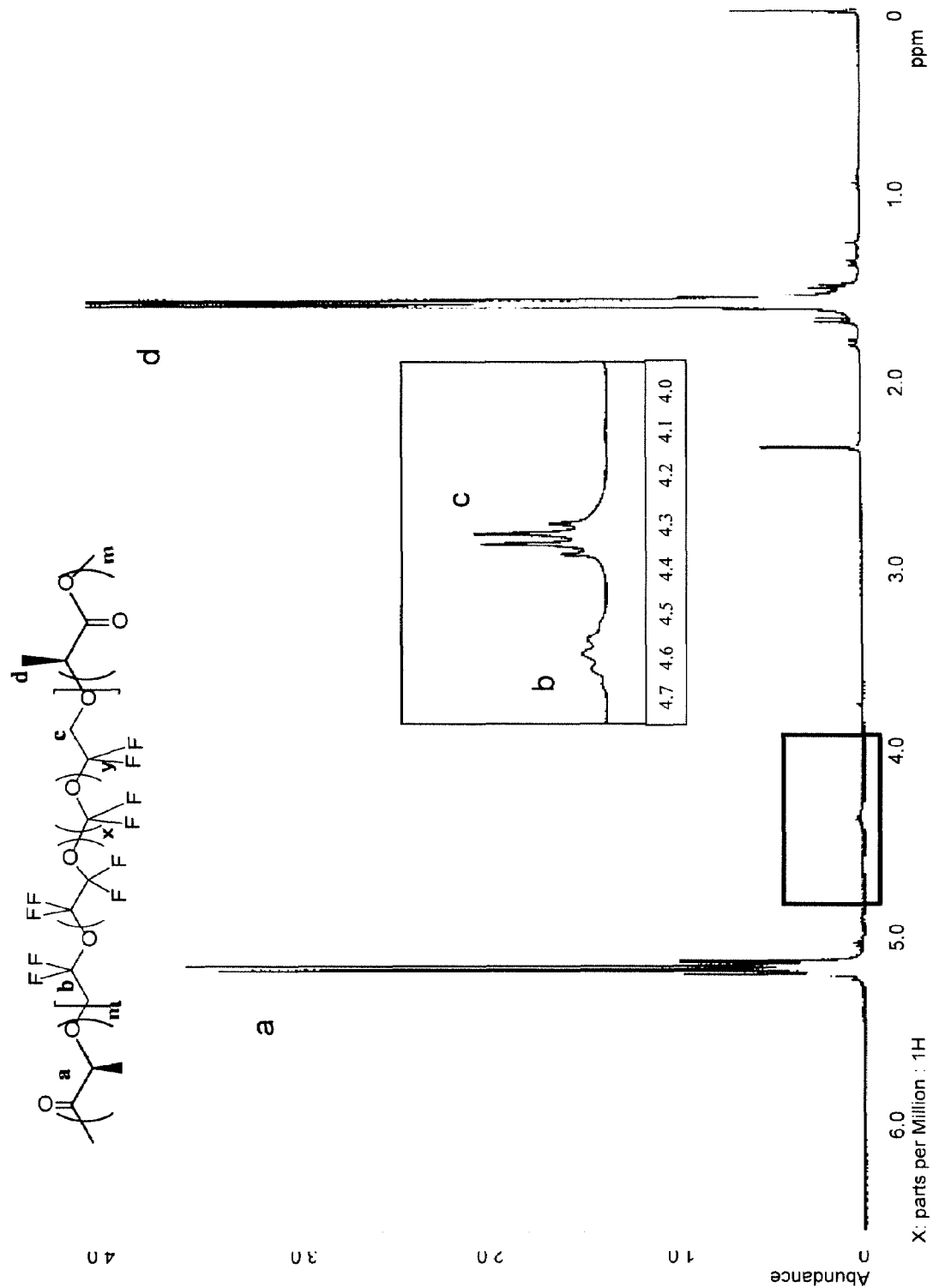
FIGS. 1A-1C illustrate the $^1$H NMR spectra (FIG. 1A), the $^{13}$C NMR spectra (FIG. 1B), and the $^{19}$F NMR spectra of a 20 wt. % PFPE/PLA copolymer FIG. 2 compares the GPC elution curves of PLA (FIG. 2A), PFPE (FIG. 2B), a 20 wt. % PFPE/PLA copolymer (FIG. 2C) and a 20 wt. % PFPE/PLA blend (FIG. 2D)
Figure 1B:
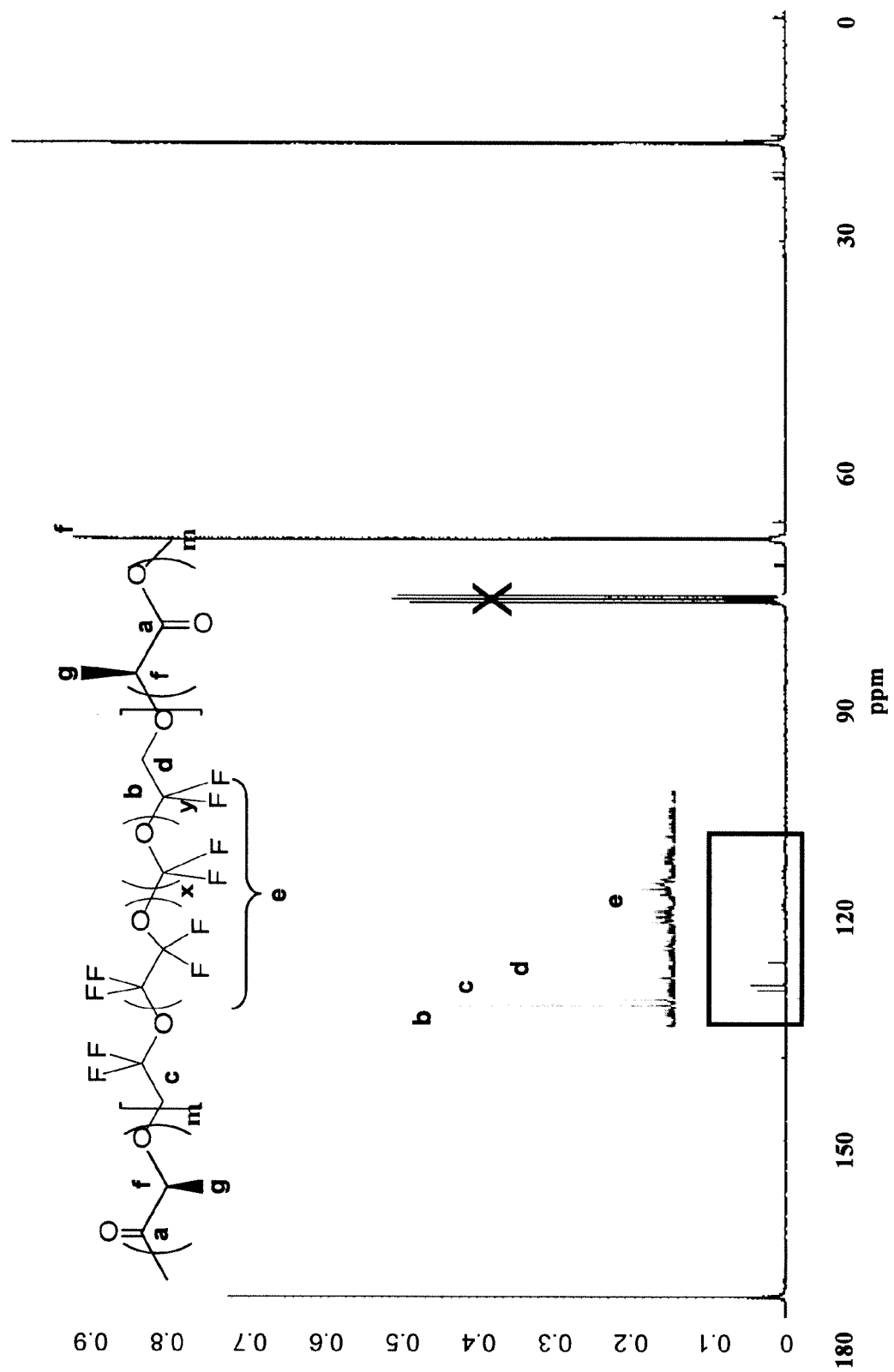

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made to the disclosed subject matter without departing from the scope or spirit of the disclosure. For instance, features illustrated or described as part of one embodiment, may be used with another embodiment to yield a still further embodiment.

In general, the present disclosure is directed to novel fluorinated lactide-based copolymers and processes for producing the copolymers as well as products that can advantageously incorporate the polymers. Copolymers as disclosed herein can exhibit good thermal and mechanical characteristics as compared to many previously known PLA polymers. For example, the copolymers can exhibit improved tensile strengths, elastomeric properties, and thermal stability. Production and use of the materials can reduce problems associated with previously known fluorocarbons, including environmental problems faced while obtaining the raw materials and during production of the materials, as well as problems associated with the eventual disposal of the polymers.

The copolymers can be utilized in forming products including fibers, coatings and films. Products including the copolymers can exhibit improved characteristics as compared to previously known lactic acid-based products. In particular, products formed of the disclosed copolymers can exhibit improved physical characteristics including melt temperatures, strength characteristics, and hydrolytic characteristics. Accordingly, formations of the copolymers can be suitable for use in a wide variety of commercial applications. For example, disclosed copolymers may be utilized in the formation of packaging materials, textiles, and coatings as well as in biomedical and commodity applications, where improved processability and rate of degradation can be significant as compared to previously known lactide-based materials.

Lactic acid occurs in nature via fermentation of carbohydrates such as glucose, sucrose, and lactose. Lactic acid is produced commercially by fermentation of whey, cornstarch, potatoes, molasses, and the like. The lactide monomer is formed by the depolymerization of the lactic acid oligomer. In the past, production of lactide was a slow, expensive process, but recent advances in the art have enabled the production of high purity lactide at reasonable costs.

The chiral carbon atom in the lactic acid structure results in the three stereoisomers of lactide, shown below:

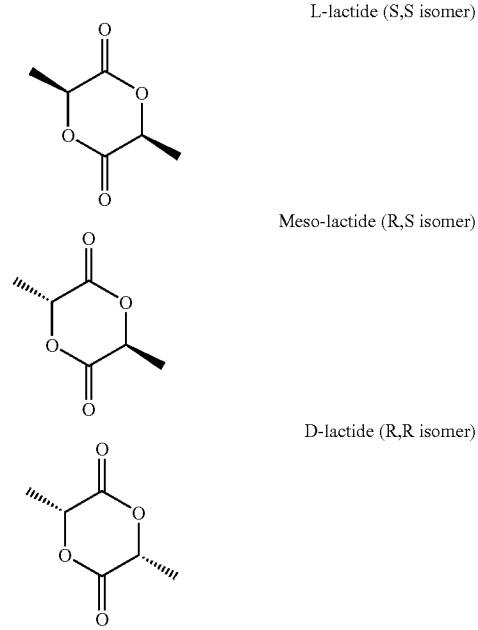

L-lactide (S,S isomer)

Meso-lactide (R,S isomer)

D-lactide (R,R isomer)

According to processes disclosed herein, either racemic mixtures or pure enantiomers of lactide may be utilized. In general, a racemate of L- and D-lactide may be preferred due to economic realities, though this is not a requirement of the disclosed subject matter.

In one embodiment, the disclosed copolymers can be formed by the ring opening polymerization of lactide in the presence of a fluorocarbon diol. Any fluorocarbon diol or combination thereof can be used in forming the disclosed materials. For instance, particular fluorocarbon diols may be preferred in certain embodiments in order to obtain a product PLA/fluoropolymer product exhibiting particular characteristics. Exemplary commercially available fluorocarbon diols that can be utilized in forming the disclosed materials can include, without limitation, fluorocarbon diols available from the Solvay Solexis Corporation including those available under the trade name Fluorolink such as Fluorolink C, D, D10-H, D10, E, E10, T, and T10 as well as Z Dol Tetraol and Z Dol TX.

In one particular embodiment, the disclosed materials can be formed using perfluoropolyether diols as macro-initiators for the ring-opening polymerization of lactide. For example, the formation process can include polymerization of lactide with one or more perfluorinated polyethers (PFPE).

A formation process can produce ABA triblock copolymers with enhanced properties. The general structure of a PFPE homopolymer as can be copolymerized with lactide monomer in one embodiment can be described as:

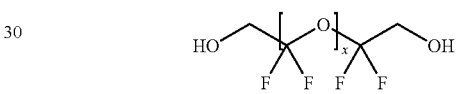

Wherein:

x is $\geq 1$

The present disclosure is not limited to PFPE homopolymers, however, and in other embodiments, lactide monomer can be copolymerized with PFPE copolymers to form the disclosed materials. One exemplary structure of a PFPE copolymer such as may be polymerized with lactide monomer according to the present disclosure can be described as:

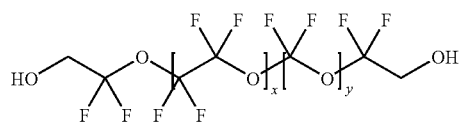

Wherein:

x is $\geq 1$ and y is $\geq 1$

When considering a PFPE copolymer, the reaction scheme may be illustrated as follows:

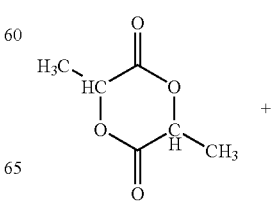

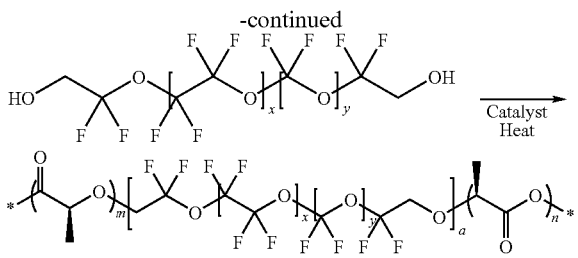

wherein:

x, y, a, m, n are all ≧1

Copolymers formed according to the disclosed methods can exhibit improved melt processability, greater surface hydrophobicity, increased ductility and elongation, controlled environmental stability, and combinations thereof as compared to PLA homopolymers.

The characteristics of the polymers formed can be particularly designed or otherwise enhanced through specific selection of the fluorinated diol to be polymerized with the lactide. For example, in one embodiment, specific functional moieties may be included on the diol that can provide desired characteristics to the formed polymeric materials. For instance, functional groups, such as aromatic moieties, may be introduced to the diols to enhance physical characteristics of the polymeric products.

In general, formation processes can include polymerizing lactide and the one or more fluorinated diols in either a solution polymerization process or from a melt. The various reactants can generally be provided in any desired proportions. For instance, the molar ratios of the reactants can be varied in order to form product polymers within a defined molecular weight range. In one embodiment, the reactants can be provided at a 1:1 ratio, but this is not a requirement of the present disclosure, and in other embodiments more or less lactide can be polymerized with regard to the amount of the fluorinated diol.

In one preferred embodiment, the copolymers can be polymerized from solution. Accordingly, a solution of the reactants may be prepared with an organic solvent that has a suitably high boiling point so as to not boil at the reaction temperature. For example, a non-limiting list of possible solvents may include anhydrous toluene, 2-methoxyethyl ether (available as Diglyme, available from Aldrich Chemical), 1-phenoxy-2-propanol (available as Dowanol™ from Aldrich Chemical), and DMAc (N,N'-dimethylacetamide). It may be preferred in some embodiments to utilize a solvent that is considered to be an ecologically friendly or "green" solvent. In one particular embodiment, ethyl lactate, a solvent that can be derived from cornstarch, can be used in the process.

Optionally, the solution may be stirred and heated prior to addition of a catalyst. For example, the solution may be heated to a temperature of between about 100° C. and about 200° C. In one particular embodiment, the solution may be heated to a temperature of about 130° C.

The polymerization can be carried out in the presence of a suitable catalyst, generally at elevated heat and/or pressure conditions, as is generally known in the art. Suitable catalysts can include any compound or composition that is known to catalyze the polymerization of lactide. Such catalysts are well known and include, for instance, alkyl lithium salts and the like, stannous and aluminum catalysts such as stannous octoate, aluminum isopropoxide, and the like, and certain rare earth metal compounds as described in U.S. Pat. No. 5,028,667 to McLain, et al., which is incorporated herein by reference. The particular amount of catalyst used can vary depending primarily on the catalytic activity of the catalyst, as well as the temperature of the process and the polymerization rate desired. Typical catalyst concentrations include molar ratios of lactide to catalyst of between about 10:1 and about 100,000:1, or in another embodiment between about 2,000:1 and about 10,000:1.

According to one process, a catalyst can be distributed in the starting lactide monomer material. If a solid, it may be preferred that the catalyst have a relatively small particle size. In one embodiment, the catalyst can be added to a solution of the reactants as a dilute solution in an inert solvent, thereby facilitating handling of the catalyst and its even mixing throughout the reactant solution. In those embodiments in which the catalyst is a toxic material, the process can also include steps to remove the catalyst from the mixture following the polymerization reaction, for instance one or more leaching steps.

Following addition of the catalyst, polymerization of the reactants can proceed over a period of time. For example, a solution including reactants and catalyst can be stirred for a period of about 24 hours to achieve polymerization. The amount of time necessary for completion of the polymerization process can vary widely, however. For example, the time required for polymerization following addition of the catalyst to the solution can be anywhere from substantially instantaneous to a period of several days.

The polymerization process can generally be carried out at elevated temperature, for example, between about 95° C. and about 200° C., or in one embodiment between about 110° C. and about 170° C., and in another embodiment between about 140° C. and about 160° C.

Depending upon the specific reactants, catalysts and solvents used in the process, product copolymers displaying particular physical characteristics may be obtained. For example, through variation of the molar ratio of reactants, copolymers with varying molecular weights may be obtained. Additionally, molecular weight of the product polymer can be controlled through variation of the catalyst and/or solvent used in the process. The polydispersity of the product polymers ($M_w/M_n$) can be similarly controlled through variation of solvent and/or catalyst, as is generally known in the art. For example, the polydispersity of disclosed polymers can be between about 1.5 and about 3.5, and in one embodiment, between about 1.8 and about 2.5.

Lactide-based copolymers may be prepared having a number average molecular weight ($M_n$) between about 3,500 and about 50,000, though in other embodiments, higher or lower molecular weight polymers may be obtained. For instance, thermoplastic polymers can be formed having number average molecular weights greater than about 50,000. In one embodiment, disclosed polymers can have a number average molecular weight between about 34,000 and about 38,000.

Following the initial polymerization process, a polymer product may be purified according to any suitable process. For example, a polymer product may be precipitated into n-hexane and dried to a solid. Any other suitable purification process as is generally known in the art may alternatively be utilized, however.

Fluorinated lactide-based copolymers as disclosed herein can be formed into a polymeric product material according to any suitable formation process and in conjunction with any suitable additives as are known to one of skill in the art. For example, disclosed polymers can be formed into a colored polymeric product and a fluorinated lactide-based polymer can be mixed or otherwise combined with coloring agents, such as dyes or other pigments. Other additives that can be combined with a polymer can include, for example, one or more of anti-static agents, nucleating agents, antioxidant agents, antimicrobial agents, adhesion agents, stabilizers, plasticizers, brightening compounds, clarifying agents, ultraviolet light stabilizing agents, surface active agents, odor enhancing or preventative agents, light scattering agents, halogen scavengers, and the like. In addition, additives can be included in a mixture to be formed into the desired shape, for instance in a melt or solution, or in other embodiments, can be applied as a surface treatment to the formed polymeric material, as generally known in the art.

Polymeric products including disclosed fluorinated lactide-based copolymers can be prepared having excellent mechanical characteristics such as, for instance, excellent tensile strengths. For example, films of the disclosed copolymers can exhibit elongations over 100%, or even higher in other embodiments, for instance elongations of between about 150% and about 300%. Moreover, copolymer formations disclosed herein can withstand extremely high tensile stress, for instance greater than 20 MPa, or greater than 23 MPa in other embodiments.

The disclosed materials can also display improved thermal characteristics as compared to PLAs known in the past. For example, disclosed polymers may have a denaturation temperature ($T_d$) greater than about 210° C. In one embodiment, the lactide-based copolymers can have a $T_d$ of between about 210° C. and about 270° C., or, in other embodiments, between about 215° C. and about 260° C.

Disclosed copolymers and polymeric materials incorporating the copolymers can also display improved hydrophobicity. For instance, films formed of the lactide-based copolymers can exhibit water contact angles greater than about 90°, or greater than about 100° in other embodiments.

Lactide-based copolymers produced as described herein may be utilized to form polymeric products such as polymeric films, fibers, or coatings according to processes generally known in the art. For example, lactide-based copolymers as described herein may be solution cast from a solvent to form a polymeric film. If desired, the polymer-containing solution can be cast at very high solids content. For instance, solutions of polymeric products may be cast wherein the polymers can be present in solution at amounts of up to about 70% by weight of the solution. In such an embodiment, relatively thick films and coatings may be prepared from the polymeric solutions. In some embodiments, polymeric films having a thickness of about 2 μm may be prepared. Polymeric films can be formed in one embodiment having a thickness between about 2 μm and about 200 μm. Thick coatings can be formed, for example, as surface coatings in painting or similar coverage applications. Films are not limited to these exemplary thicknesses, however, and thicker or thinner coatings may be prepared in other embodiments. For example, in one embodiment, coatings of the disclosed lactide-based polymers can be formed having a thickness of up to or even greater than about 1 mm.

The disclosed copolymers can also be formed into fibers, for example textile fibers, monofilament fibers, and the like. For example, the lactide-based copolymers can be melt spun or solution spun to form polymeric fibers. In one embodiment, fibers having a diameter of between about 2 μm and about 200 μm can be formed. In another embodiment, polymeric fibers (e.g., monofilaments) can have a diameter of between about 50 μm and about 1 mm. In yet another embodiment, large polymeric monofilaments can be formed having a diameter of about 1 cm. Fibers and monofilaments can be utilized in a variety of textile application, such as, for instance, the formation of woven or nonwoven fabrics.

In another embodiment, copolymers can be electrospun to form fibers of extremely small diameter. Electrospinning, invented in the 1930's, is an electrostatic process that has widely been used for drawing out nano-sized fibers from many different polymers. Due at least in part to the ability to form fibers of extremely small diameter (generally less than about 5 μm in diameter) the method can be very effective for producing extremely high surface area fibers and fabrics.

In general, an electrostatic spinning process consists of the application of an electrical field to a solution of the copolymer, inducing a charge on the individual polymer molecules. The polymer solution can be held in a capillary tube by its surface tension at the air-surface interface. Upon application of an electric field, a charge and/or dipolar orientation will be induced at the air-surface interface that causes a force that opposes the surface tension. At critical field strength, the repulsive electrostatic forces will overcome forces due to the surface tension, and a jet of polymeric material will be ejected from the capillary tube. The jet is elongated and accelerated by the external electric field as it leaves the capillary tube. The trajectory of the jet can be controlled by applying an appropriately oscillated electrostatic field, allowing for directional control of the jet. As the jet travels in air, some of the solvent can evaporate, leaving behind charged polymer fibers that can be collected on a take-up reel. As the fibers are collected, the individual fibers may fuse, forming a nonwoven web or fibrous membrane on the take-up reel.

The critical field strength required to overcome the forces due to solution surface tension and form the jet will depend on many variables of the system. These variables include not only the particular polymers and solvents included in the solution, but also the polymer concentration and solution viscosity, as well as the temperature of the system. In general, characterization of the jet formed, and hence characterization of the fibers formed, depends primarily upon solution viscosity, net charge density carried by the electrospinning jet and surface tension of the solution. The ability to form the small diameter fibers depends upon the combination of all of the various parameters involved. For example, electrospinning of lower viscosity solutions will tend to form beaded fibers, rather than smooth fibers. In fact, many low viscosity, low molecular weight polymer solutions will break up into droplets or beads rather than form fibers when attempts are made to electrostatically spin the solution. Solutions having higher values of surface tension also tend to form beaded fibers or merely beads of polymer material, rather than smooth fibers.

When forming electrospun fibers and nonwoven webs including disclosed copolymers, the packing density of the web can be varied through modification of the take-up speed of the fibers at the take-up reel. For example, in one embodiment, take-up speed can be between about 100 m/min and about 500 m/min. In one embodiment, take-up speed can be about 400 m/min.

Optionally, the fluorinated copolymers disclosed herein can be utilized in conjunction with other, previously known polymerization formation schemes or with other, previously known polymers in forming improved polymeric composite materials.

The disclosed subject matter may be better understood with reference to the examples that are set forth below. Each example is provided by way of explanation of the subject matter, not as a limitation of the subject matter.

EXAMPLE 1

Materials

Lactide, Stannous Octoate, and chloroform-D were purchased from Sigma-Aldrich Corporation. Poly(tetrafluoroethylene, oxide-co-difluoromethylene oxide) α, ω-diol (Fomblin® Z DOL) was obtained from Solvay Solexis. All other chemicals and reagents were purchased from Fisher Scientific or Sigma-Aldrich and used as received unless otherwise stated.

Instrumentation $^1H$, $^{13}C$ and $^{19}F$ NMR spectra were obtained using the Bruker AF-300 spectrometer system. Chloroform-d was used as solvent and chemical shifts reported were internally referenced to tetramethylsilane (0 ppm), and $CDCl_3$ (77 ppm) for $^1H$ and $^{13}C$ nuclei, respectively.

Thermal Gravimetrical Analysis (TGA) data were obtained from a Mettler-Toledo 851 TGA/SDTA System at a heating rate of 10° C./min in a nitrogen atmosphere.

Differential Scanning Calorimetry (DSC) was obtained from a TA instruments Q1000 system with an auto sampler and liquid nitrogen cooling system. Analysis was carried out using TA instruments Universal Analysis Software.

Glass transition temperature ($T_g$) was obtained from a second heating curve after cooling at 10° C./min. The reported $T_g$ value was taken at the midpoint of the $C_p$ curve.

Gel Permeation Chromatography (GPC) data was collected in $CHCl_3$ using a Waters Alliance refractive index detection at 35° C. and equipped with Polymer Labs PLGel 5 mm Mixed-C and Mixed E columns. Retention times were calibrated against Polymer Labs Easical PS-2 polystyrene standards.

Surface morphology analysis was done on samples using a Zygo white light interferometer microscope using 50× magnifications.

Atomic Force Microscopy was performed on non-oriented spin coated films of PFPE/PLA and FluoroPLA20 copolymers using Digital Instrument Multimode Nanoscope (IV) system in tapping mode using silicon cantilever tips with scan rates between 0.5 and 1 Hz.

Viscoelastic measurements were performed using a Rheometric Scientific ARES rheometer. Samples were tested using a cone and plate geometry with a diameter of 25 mm where dynamic strain and frequency tests were conducted at a temperature of 165° C.

Fourier transform Infrared (FTIR) spectroscopy was performed on thin films of PFPE/PLA and copolymers and the neat liquid of PFPE using a ThermoNicolet Magna-IR™ 550 FTIR spectrometer equipped with a Nic-Plan microscope, with a resolution of 2 $cm^{-1}$ using 16 scans.

Static water contact angle measurements were obtained with a Kruss G10 instrument and the average static contact angles were obtained using at least six droplets on each film specimen. The static contact angle (equilibrium) were measured using a Krüss Contact Angle machine by sessile drop method for Water, Glycerol, Formamide, Methylene Iodide and n-Hexadecane on PFPE/PLA and high molecular weights of the PFPE/PLA-PFPE copolymers dip coated on silicone wafers.

Blend Preparation of 5-20 wt. % PFPE Content in Blend

Solution blending took place in $CHCl_3$ solvent to obtain the compositions of PFPE in PFPE/PLA at the desired blend ratios reported as weight percent (wt. %) PFPE. Following formation, the solution was precipitated in swirling methanol and dried in vacuo.

General Procedure of the synthesis of ABA Triblock Copolymer

To a 5 mL glass ampoule under nitrogen the desired composition amounts of poly(tetrafluoroethylene oxide-co-difluoromethylene oxide) α, ω-diol Fomblins Z-DOI™ (PFPE), L-LA and $Sn(Oct)_2$ (100 μL of 0.01 mol $L^{-1}$ solution in anhydrous toluene) were added. The ampoule was then heated to facilitate mixing and sealed under vacuum. The tube was then immersed in a preheated oil bath at 130° C. for 24 hours. The crude product was then dissolved in chloroform and precipitated into cold swirling methanol repeatedly. The resulting polymer was dried in vacuo to afford a white fibrous material.

Yield: >90%. FTIR (neat film) (cm-1): 693, 754, 869, 918, 956, 1044, 1080, 1183, 1127, 1180, 1264, 1359, 1382, 1453, 1684, 1749, 2881, 2945, 2996; $^1H$ NMR (300 MHz, $CDCl_3$) δ (ppm): 5.14 (q, J=7.30 Hz, α-H, PFPE/PLA), 4.56 (q, J=9.96 Hz, —$CF_2CF_2OCH_2$—, PFPE) 4.34 (q, J=6.85 Hz, —$CF_2OCH_2$—, PFPE) 1.56 (d, J=6.88 Hz, —$CH_3$, PFPE/PLA); $^{13}C$ NMR (300 MHz, $CDCl_3$) δ (ppm): 169.70, 129.11, 128.31, 125.38, multiplet 118.43-114.23, 16.72; $^{19}F$ NMR (300 MHz, $CDCl_3$) δ (ppm): −53.5, −55.10, −56.83, −78.27, −80.25, −81.67, −83.72, −85.41, −87.11, −90.27, −92.13, −127.27, −130.83.

Film Preparation

Films of PFPE/PLA, 1, 5, 10 and 20 wt. % PFPE/PLA copolymer and blend were made using 10% solvent to polymer ratio, The solutions were then poured onto glass plates and allowed evaporated slowly for 72 hours, then placed in a vacuum oven for further solvent removal.

Degradation Studies of Polymer Film Samples

Polymer films were cast from a 10% (w/v) solution in $CHCl_3$ using Teflon sheets. After 72 hours of drying at a temperature of 4° C., the samples were recovered and disks with a diameter of 17 mm were punched from the film sheets using a cork bore. The film disks were then placed in vacuo at room temperature until constant weights were achieved. To determine the in vitro degradation profiles, weighed films were placed in 10 mL of phosphate buffered saline (PBS, pH 7.4, 0.15M) and kept at 37° C. in an incubator with constant agitation. Samples were removed at designated times, blotted with kimwipes and freeze dried using a lyophilizer at −35° C. for approximately 72 hours. Polymer mass loss was calculated from the following formula: Mass loss (%)=100−(mass (dry)×100/(original mass)).

Results

Table 1, below, summarizes characteristics obtained for the PFPE polymers, PLA polymers, blends and copolymers formed according to the methods described above. The molecular weights reported are based on the PFPE/PLA trace of the copolymers and blends. The relatively low molecular weight shown for the PFPE material is based on characterization against polystyrene standards, however, it was determined to be 1581 calculated by NMR. The $M_n$ values remain constant in the starting material and the blends for the PFPE trace and the molecular weights of the copolymer were relatively high as compared to PLA.

TABLE 1

| Sample | PFPE Feed Wt. % (exp)[a] | $M_n^b \times 10^{-3}$ | $M_w/M_n^b$ | $T_m^c$ | $T_c^c$ | $T_g^c$ | % cryst.[d] | $T_d^e$ |
|---|---|---|---|---|---|---|---|---|
| PFPE | 100 (100) | .5 | 1.1 | — | — | −104 | — | 270 |
| PLA | — | 57 | 2.1 | 176 | 111 | 61 | 51 | 253 |
| 1% copolymer | 1 (.95) | 58 | 1.8 | 173 | 96 | 54 | 53 | 245 |
| 1% blend | 1 (.99) | 58 | 2.7 | 175 | 109 | 59 | | 243 |
| 5% copolymer | 5 (4.8) | 64 | 1.7 | 166 | 92 | 51 | 44 | 246 |
| 5% blend | 5 (5) | 57 | 2.8 | 174 | 102 | 58[g], −101[f] | 23 | 253 |
| 10% copolymer | 10 (8.3) | 51 | 1.9 | 174 | 104 | 59 | 37 | 251 |
| 10% blend | 10 (9.7) | 59 | 3.3 | 175 | 92 | 59[g], −101[f] | 46 | 265 |
| 20% copolymer | 20 (17.2) | 42 | 1.8 | 161 | 62 | 45 | 31 | 239 |
| 20% blend | 20 (19) | 60 | 3.6 | 175 | 92 | 60[g], −99[f] | 52 | 273 |

[a]Calculated from $^{19}$F NMR,
[b]Determined by GPC,
[c]Determined by DSC,
[d]Determined from fully crystalline PFPE/PLA and DSC,
[f]Determined by TGA,
[e]Determined by TGA,
[g]transition associated with PFPE/PLA,
[f]Peak associated with PFPE.

Figure 1C:
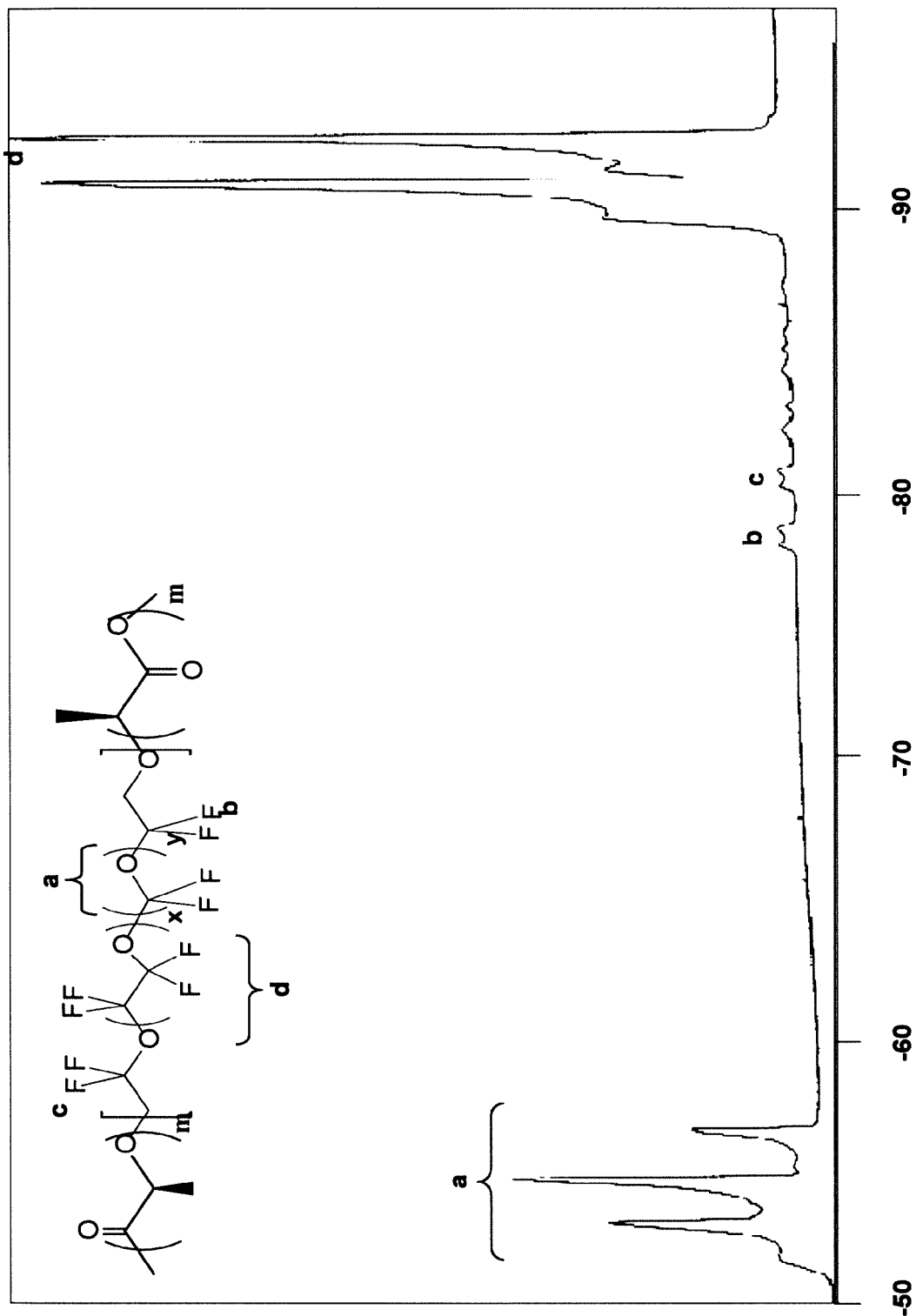

FTIR analysis of the copolymers shows the absence of the broad OH stretch at 3360 cm$^{-1}$ present in homo PFPE and the PFPE/PLA blends. Monomer conversion and growth of polymer was determined by NMR analysis of the —CH2— region for the perfluoropolyether and the —CH3 region for the PLA segments. The $^1$H NMR spectrum of PFPE starting material is characterized by the multiplet at 3.5 ppm which can be assigned to the —CH2— signals of the perfluoropolyether segment and the hydroxyl proton signal at 5.2 ppm in the starting perfluoropolyether diol. The hydroxyl proton signal is not visible in the FluoroPLA copolymers as expected (FIG. 1A). The shift of the —CF2CH2O— multiplet signals to 4.4 ppm from the original signals at 3.5 ppm shows the effect of the new ester linkage. The signals corresponding to PLA are a doublet at 1.56 ppm and a quartet at 5.1 ppm for the —CH3— and —CH— groups, respectively. The $^{19}$F NMR spectra (FIG. 1C) is similar to the perfluoropolyether precursor, except for the new signals for the —CF2CH2OR— (R═PLA units) segments at −78.3 and −80.3 ppm compared to the starting —CF2CH2OH end group signals at −84.5 and −82.6 ppm. Minor signals from the unreacted perfluoropolyether end groups are slightly visible and integration allows for the determination of PFPE % incorporation.

Figure 2:
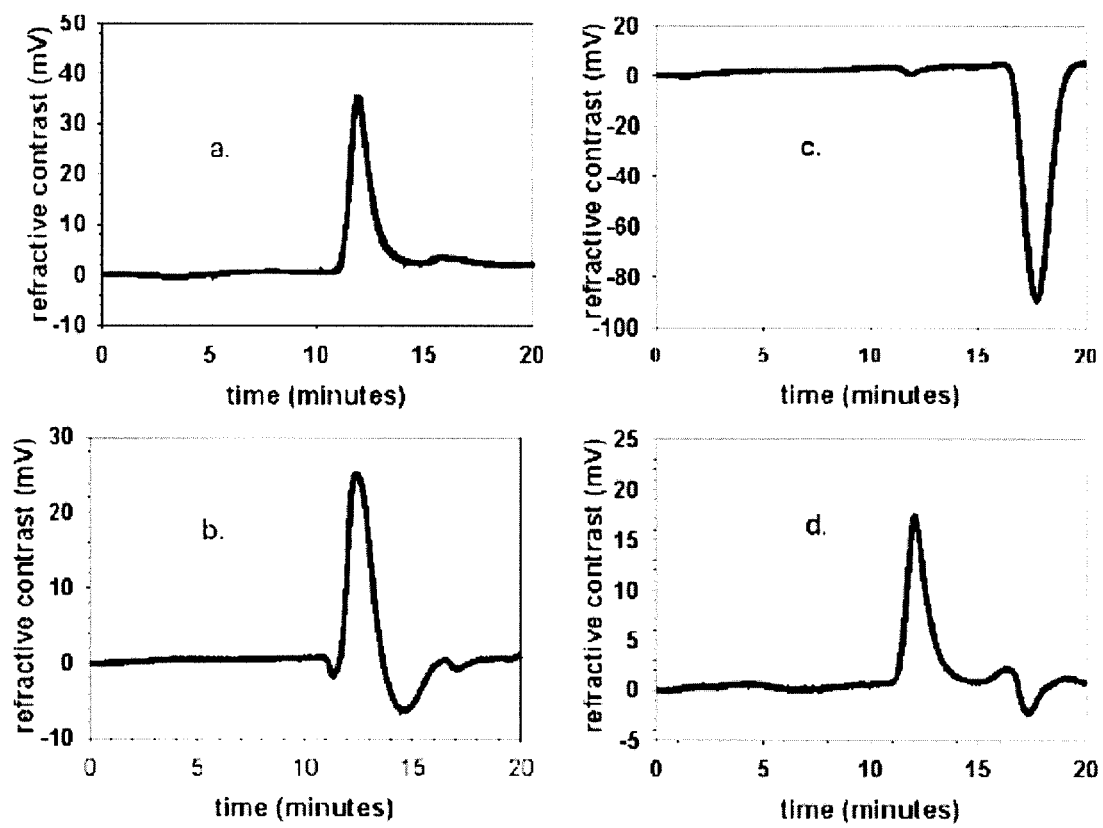

Molecular weights of copolymers were determined by gel permeation chromatography (GPC). FIG. 2 shows the GPC chromatograms of PLA (FIG. 2A), PFPE (FIG. 2B), a 20 wt. % copolymer (FIG. 2C), and a 20 wt. % blend (FIG. 2D). Relatively high molecular weights ($M_n$=40-65K) were obtained with low polydispersities. GPC analysis shows a distinct peak for the 20 weight % copolymer (FIG. 2C) that is different than that for PLA, PFPE and the corresponding blend. The negative, inverted signal for the copolymer is due to the disparity of refractive indices between the solvent and the fluorinated oligomer. The formation of the ABA block copolymer is rationalized by the overlap of the positive and negative curves (cf. FIG. 2B), whereas compared to the blend, the negative and positive curves corresponding to the PLA and PFPE signals are eluted at different times as shown in FIG. 2D.

Figure 3:
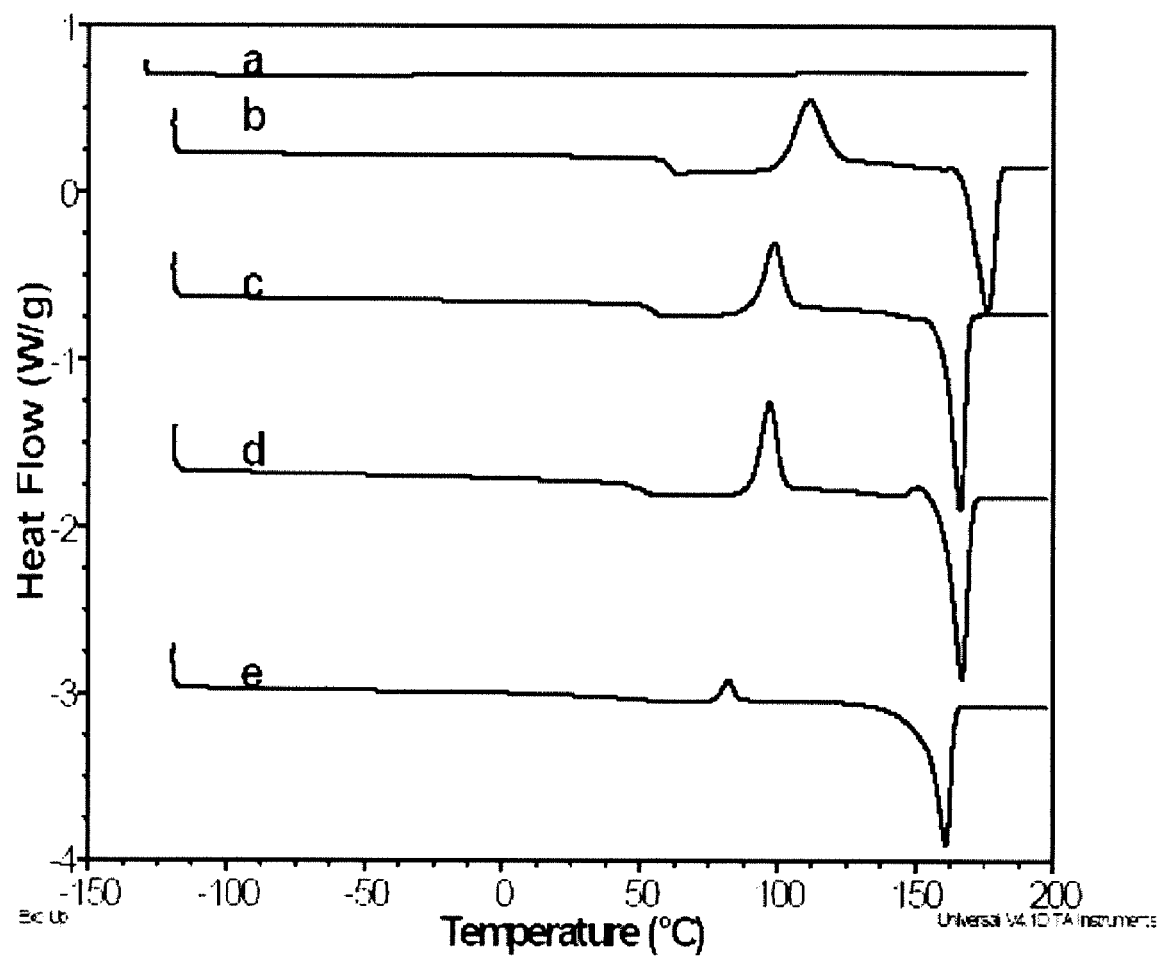
FIG. 3 illustrates the differential scanning calorimetry (DSC) thermograms of PFPE (a), PLA (b), a 5 wt. % PFPE/PLA copolymer (c), a 10 wt. % PFPE/PLA copolymer (d), and a 20 wt. % PFPE/PLA copolymer (e)
Figure 4:
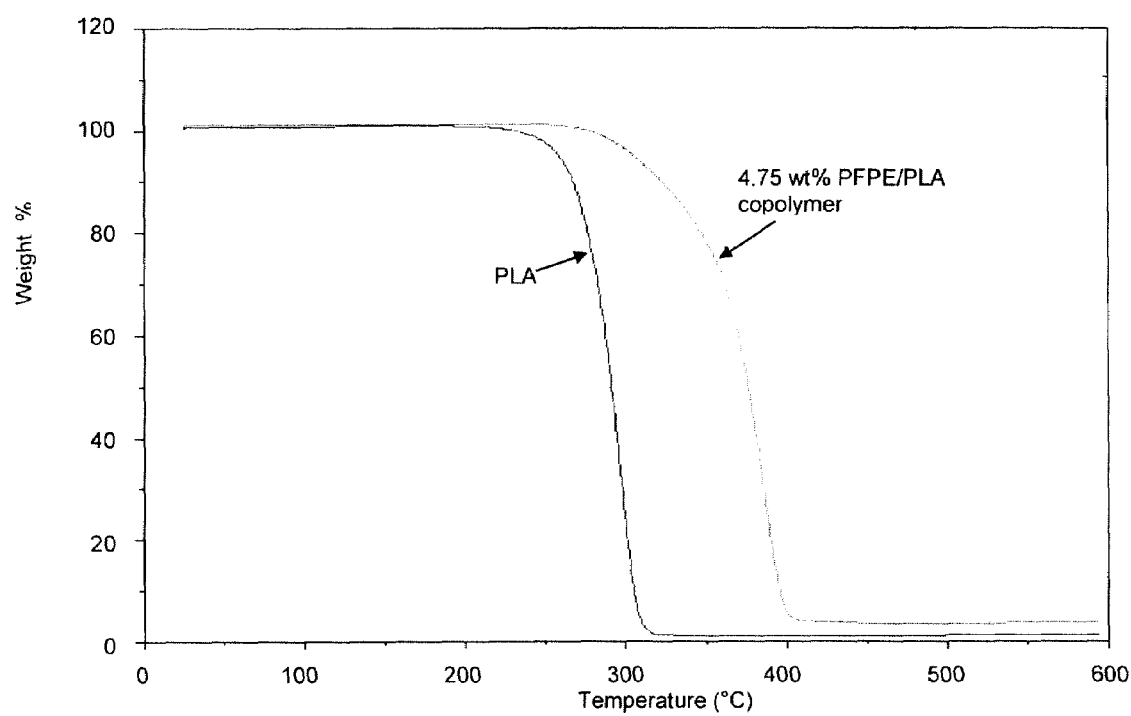
FIG. 4 illustrates the thermal gravitational analysis (TGA) of PLA and a 4.75 wt. % PFPE/PLA copolymer.

Thermal Analysis of the materials showed a significant increase in the thermal stability as compared to PLA alone and as depicted in FIGS. 3 and 4. The thermograms for PFPE (a), PLA (b), and 5 wt % (c), 10 wt % (d), and 20 wt % (e) copolymers are shown in FIG. 3. The decrease in $T_g$ of the copolymer as more PFPE is incorporated can allow for significant variations in the mechanical and thermal properties of the materials. The degree of crystallinity is also altered depending upon the amount of perfluoropolyether introduced into the polymerization. Referring to the TGA information of FIG. 4, the degradation of PLA occurred in a single stage at 210° C., whereas the degradation of a 4.75 wt. % PFPE/PLA copolymer synthesized under the same conditions was at 255° C. The degradation temperature of the PFPE and a 20 wt % blend were found to be 270° C. and 273° C. respectively as shown in Table 1. With 20 wt % loading of PFPE, the $T_g$ is lowered by 15-20° C. from that of the PLA homopolymer. The changes in glass transitions can be attributed to the effect of PFPE content on the heat capacity and expansion coefficient. Dense chain packing of the crystalline regions of PLA is further interrupted by the elastomeric PFPE segments which affect volume and enthalpy variations associated with glass transitions. These transformations offer rationale into the dramatic changes in mechanical properties when a load is applied, as further discussed below. In general, other DSC changes due to the inclusion of PFPE into PLA include decreased crystallization temperature, melting temperature and overall crystallinity at high loading of PFPE.

Addition of fluorinated additives and in particular crosslinked PFPEs have been known to dramatically lower surface energies. Contact angle measurements were done using a variety of polar and non polar liquids and the surface energy of PLA and PFPE/PLA copolymers were calculated by the Owens, Wendt, Rabel and Kaelble method which assumes that the total surface energy is the sum of its polar and dispersive components. The solvent wettability results and surface energies are summarized in FIGS. 5A and 5B and in Table 2, below.

The surface energy of PLA was found to be in close proximity with literature values of 35-43 mN/m. Incorporation of PFPE content of as low as 1 wt % of the PLA segments lowered the polar and dispersive components of PLA from 8 mN/m and 27 mN/m to 2 mN/m and 15 mN/m, respectively. Further incorporation of PFPE segments did not alter the surface energies significantly but made the copolymers (a 5 wt. %) highly hydrophobic (water contact angle ≧100°).

PFPE/PLA copolymers showed surface energies very similar to polytetrafluoroethylene (PTFE) which is reported to be 18-20 mN/m.

TABLE 2

Surface Energy (mN/m) of PLA and PFPE/PLA copolymer

| Polymer | Rabel (Regression) | | | Kaelble (Average) | | |
| --- | --- | --- | --- | --- | --- | --- |
|  | Polar | Dispersive | Total | Polar | Dispersive | Total |
| PLA | 8.2 | 26.8 | 35.0 | 9.3 | 28.6 | 37.9 |
| 1% copolymer | 2.4 | 15.2 | 17.5 | 3.6 | 16.3 | 19.9 |
| 5% copolymer | 1.2 | 14.5 | 15.6 | 1.7 | 16.2 | 17.9 |
| 10% copolymer | 1.6 | 15.0 | 16.6 | 3.8 | 17.3 | 21.1 |
| 20% copolymer | 2.4 | 14.3 | 16.8 | 4.9 | 17.1 | 22.0 |

Incorporation of flexible elastomeric segments in a brittle matrix has been known to improve upon a polymer's ductility. PFPE/PLA copolymers film strips from solvent casting and melt-spun fibers using a conventional melt-processing device were tested using an Instron tensile tester. Copolymer films appeared transparent whereas PFPE/PLA blends appeared opaque. Tensile tests on thin strips of solution cast films of the copolymers reveal a stress-strain curve that is characteristic of a toughened plastic. Presence of PFPE segments (~5 wt. %) in the copolymer causes yielding of the specimen at constant yield stress and thereby enhances ultimate elongation. At very low PFPE content (1 wt. %) the effect was not very significant; whereas at very high PFPE content (10-20 wt. %) the polymer molecular weight was significantly reduced and a weak, brittle polymer was formed. Compared to the hard, brittle PLA homopolymer, which has a higher modulus (initial slope of curve) and low ultimate strain (10-15%), the PFPE/PLA copolymer containing 5 wt. % PFPE could be elongated to over five times the elongation of PLA before failure occurred. The tensile strength and modulus of copolymer were slightly lower than that of the PLA. The variation of PFPE segments molecular weight in the 5 wt. % copolymer further affected the ultimate strain.

Figure 6:
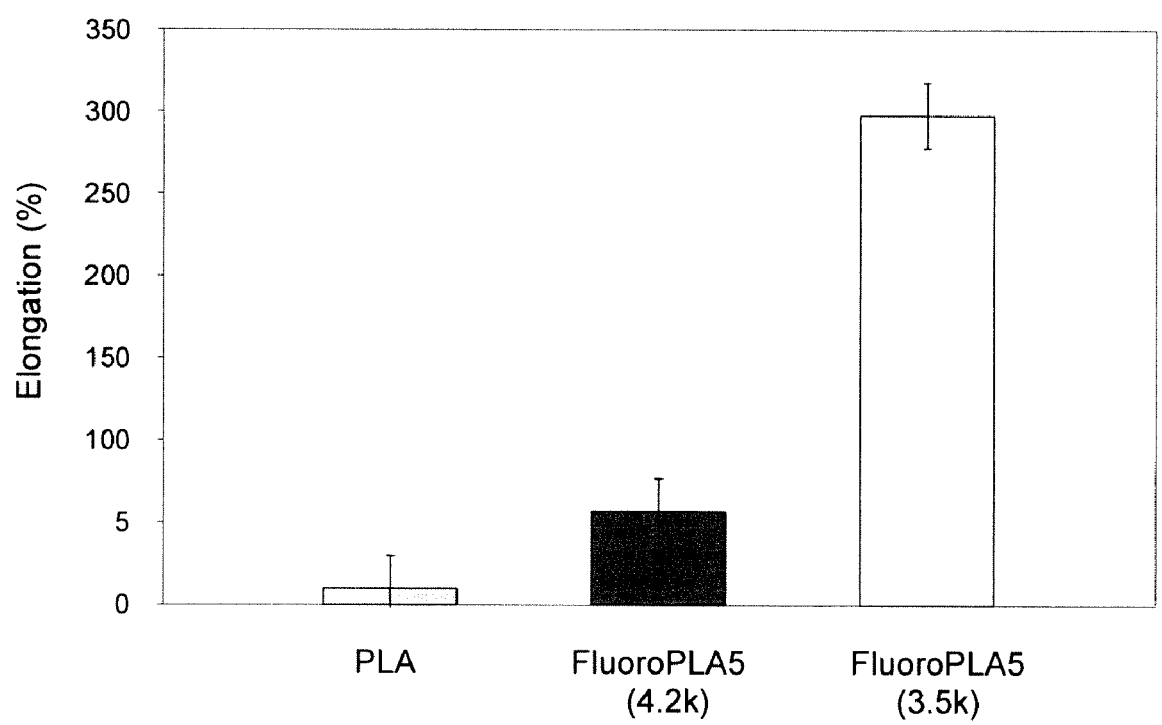
FIG. 6 illustrates the ultimate tensile elongation of PLA and PFPE/PLA 5 wt/0 copolymer fibers.

Tensile strength analysis (FIG. 6) illustrated that the ultimate elongation possible for the copolymer films increased significantly over PLA, thus providing improved mechanical properties. The ultimate stress values obtained also show improvement over PLA alone.

Figure 7:
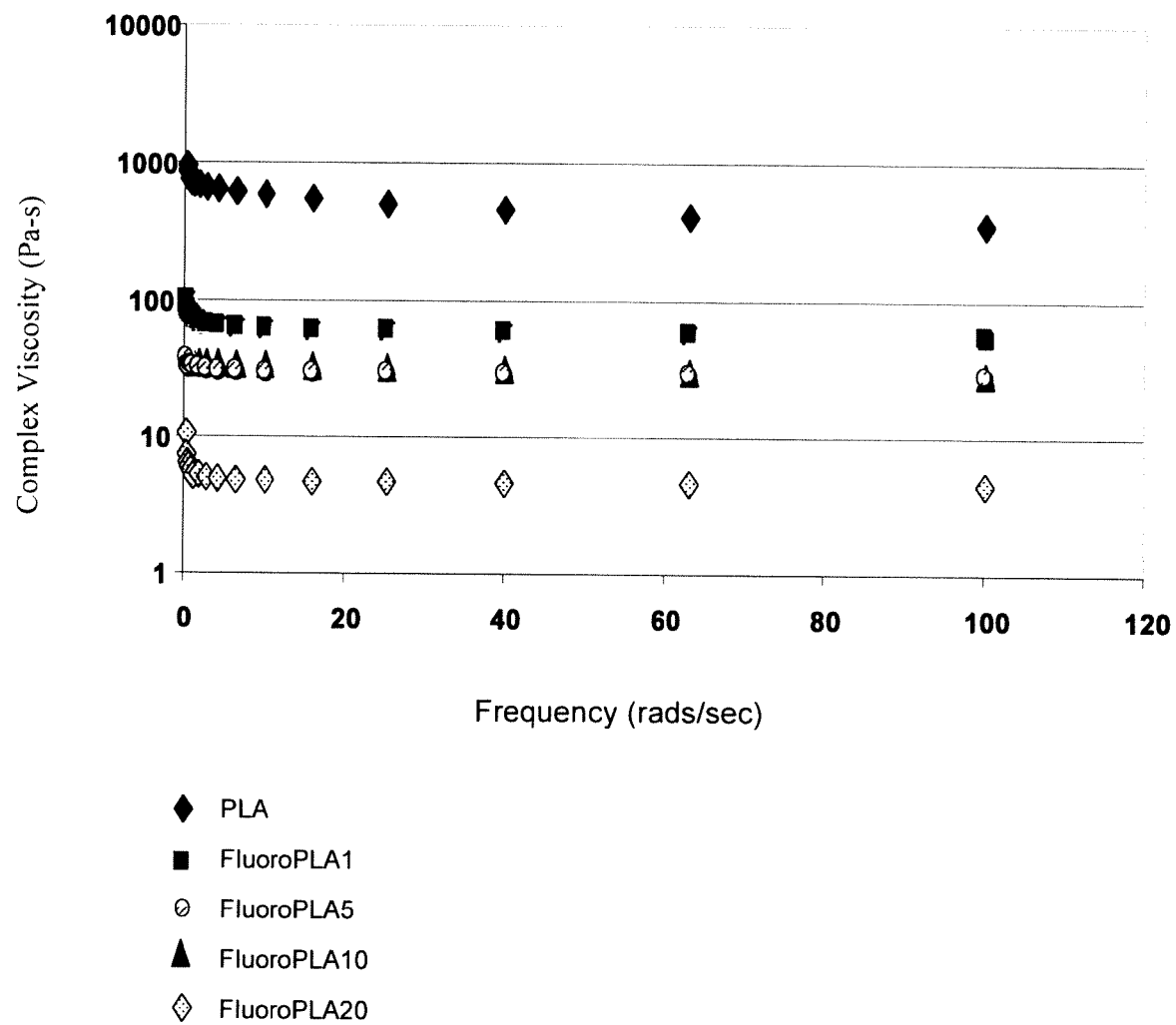
FIG. 7 illustrates the complex viscosity v. frequency curves at 165° C. for PLA, a 1 wt. % PFPE/PLA copolymer, a 5 wt. % PFPE/PLA copolymer, a 10 wt. % PFPE/PLA copolymer, and a 20 wt. % PFPE/PLA copolymer.

FIG. 7 illustrates the complex dynamic viscosity data (obtained using cone-plate geometry) for PLA, and PFPE/PLA copolymers of similar molecular weight ranges. The data show significant reduction in melt viscosity after incorporation of even 1 wt % PFPE segments. The flexible PFPE segments are likely acting as an internal plasticizer, allowing for improved flexibility in the PLA polymer chains. The copolymers are melt-processable at a temperature (175° C.), significantly lower than that of the PLA homopolymer (190-200° C.) which allows for favorable processing conditions.

Figure 8A:
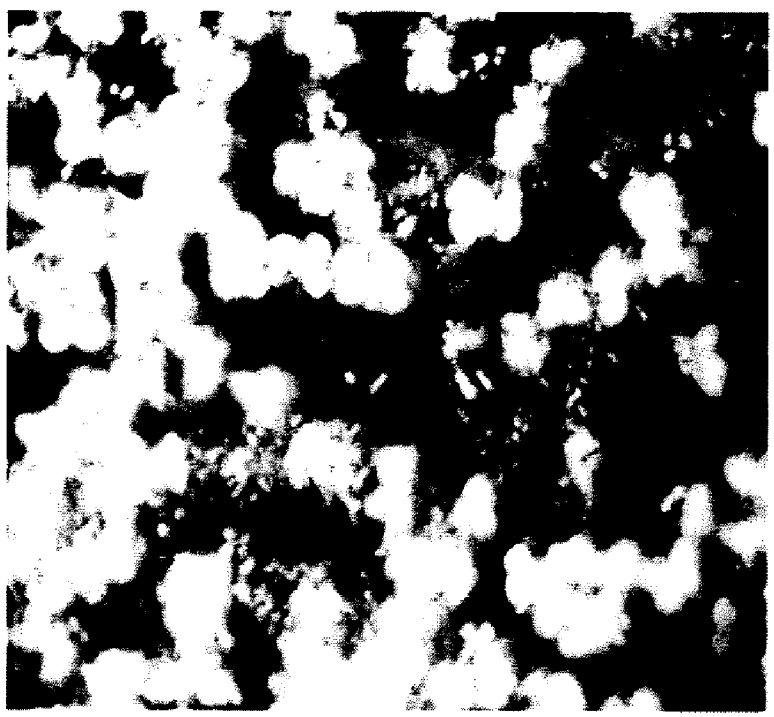
FIG. 8 illustrates the polarized optical microscopy of a 5 wt. % PFPE/PLA copolymer at higher (FIG. 8A) and lower (FIG. 8B) magnifications.
Figure 8B:
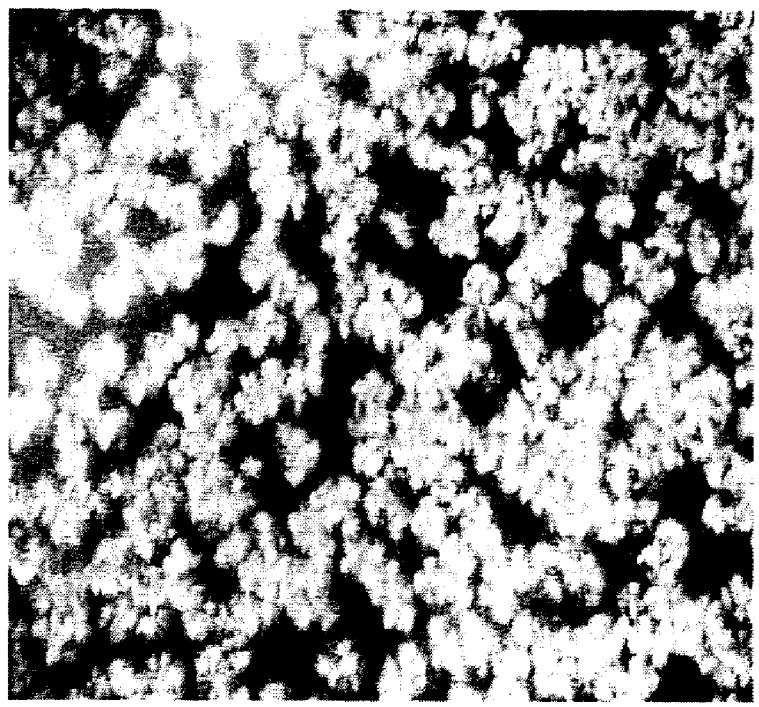
Figure 9A:
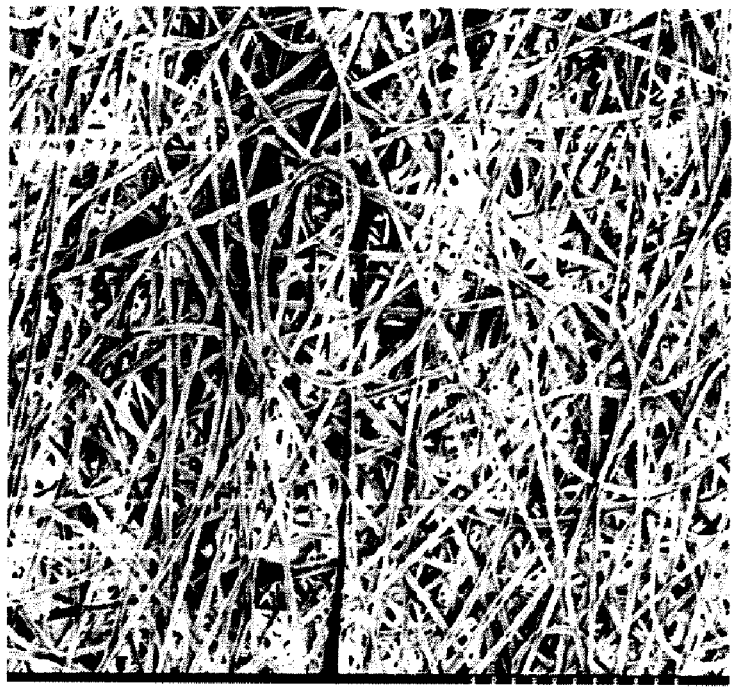
FIG. 9 illustrates electrospun fibers formed of PFPE/PLA and a 5% PFPE/PLA copolymer at higher (FIG. 9B) and lower (FIG. 9A) magnifications.
Figure 9B:

FIG. 8 illustrates the polarized optical microscopy of a 5 wt. % PFPE/PLA copolymer at higher (FIG. 8A) and lower (FIG. 8B) magnifications and FIG. 9 illustrates electrospun fibers formed of the 5 wt. % PFPE/PLA copolymer at higher (FIG. 9B) and lower (FIG. 9A) magnifications.

Figure 10:
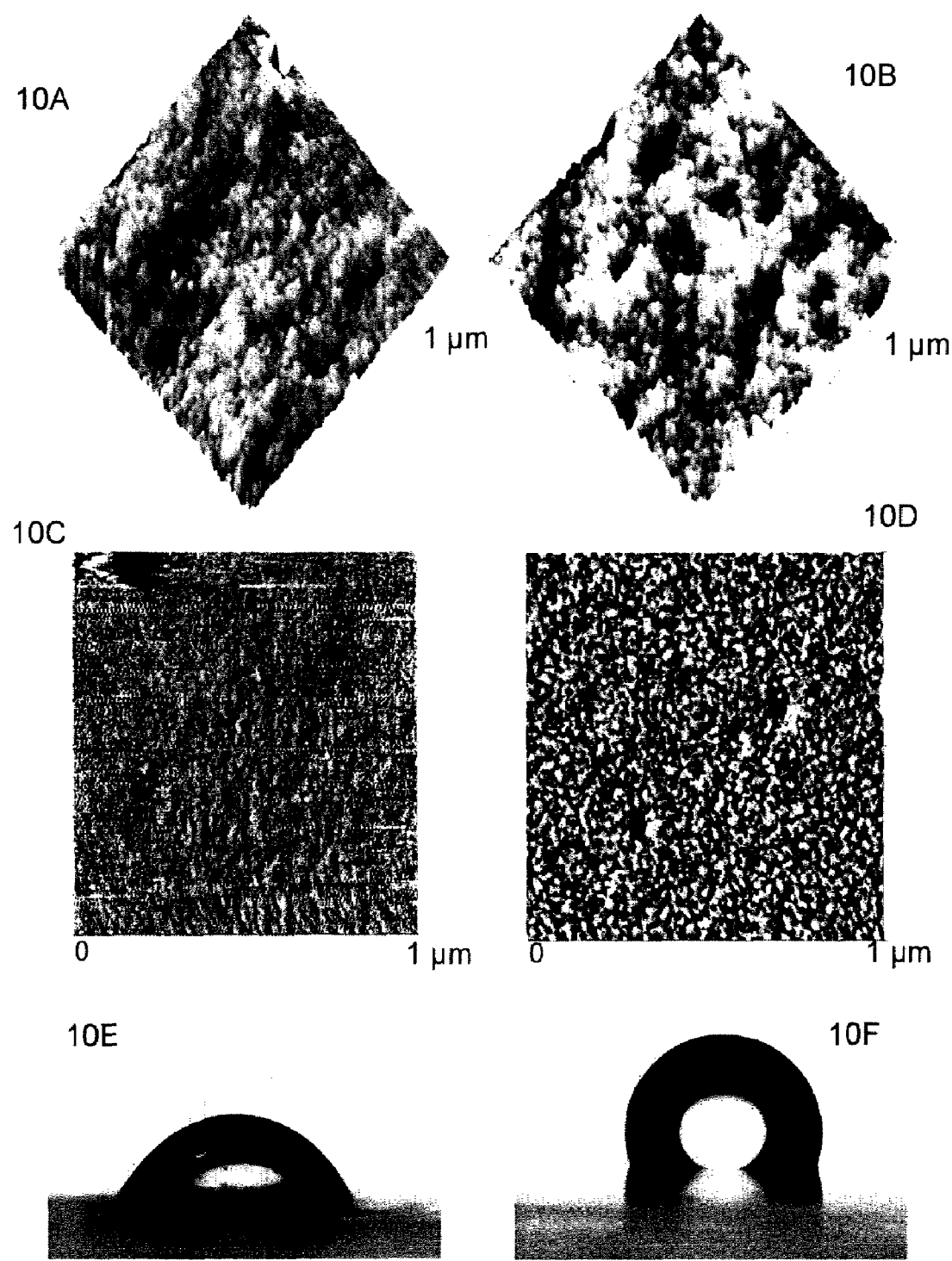
FIG. 10 illustrates the Atomic Force Microscopy (AFM) topology (FIGS. 10A, 10B), phase studies (FIGS. 10C, 10D), and water drop images (FIGS. 10E, 10F) of 1×1 µm images of PLA (FIGS. 10A, 10C, 10E) and PFPE/PLA 20 wt % copolymer (FIGS. 10B, 10D, 10F) spin coated films.

Morphological characterization of micron size ranges of PLA homopolymer and PFPE/PLA 20 wt. % copolymer films were investigated by AFM. Results show differences in height and phase images with the variation of PFPE content in the PFPE/PLA matrix. In the topographical mode, surface height is altered from neat PLA to copolymer. In the phase mode, white phase domains representative of the fluorinated domains is increased as the degree of PFPE loading is increased. This observation offers a qualitative rationale for the increase in contact angles and changes in surface energies. AFM micrographs showing phase, height image, and water drop image for PLA and 20 wt % PFPE/PLA copolymer are displayed in FIGS. 10A and 10B, respectively.

Figure 11A:
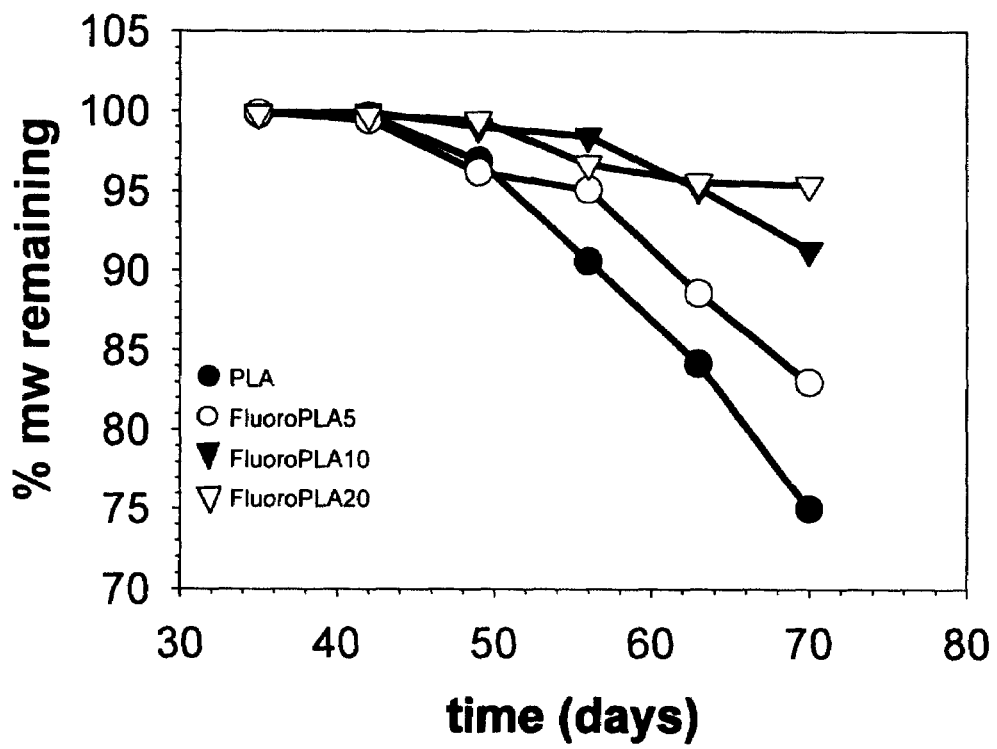
FIG. 11 illustrates in vitro degradation results in terms of % molecular weight remaining v. time (FIG. 11A) for PLA, a 5 wt. % PFPE/PLA copolymer, a 10 wt. % PFPE/PLA copolymer, and a 20 wt. % PFPE/PLA copolymer and GPC overlay chromatograms of degradation over time for PLA (FIG. 11B), and a 20 wt % PFPE/PLA copolymer (FIG. 11C).
Figure 11B:
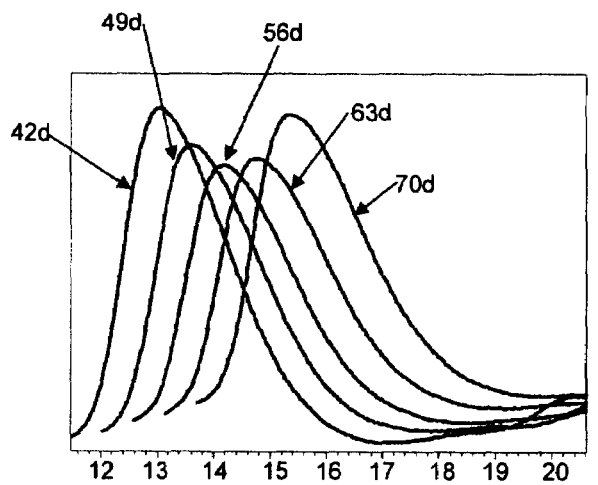
Figure 11C:
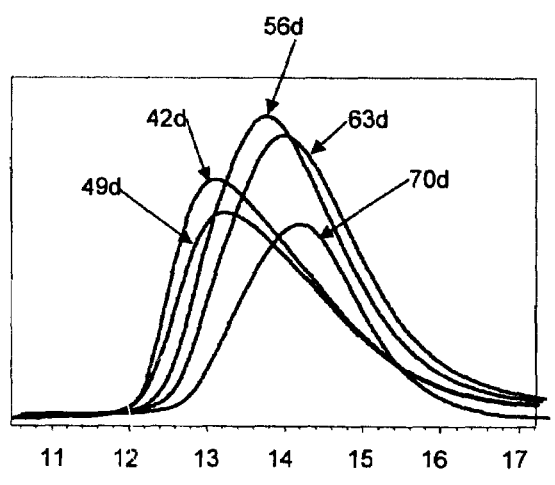

Biodegradation studies were done in vitro to determine PFPE/PLA copolymer stability characteristics. The effects that PFPE has on PLA properties associated with hydrolysis and control of degradation can be determined by monitoring the polymers weight loss. Constant agitation for 60 days in Phosphate Buffered Saline (PBS) solution at 37° C. in an incubator was performed to determine the rate of biodegradation. Results (FIG. 11A) showed that PLA homopolymer underwent a substantial decrease in molecular weight and mass loss as compared to the PFPE/PLA copolymers. The effect of incorporating PFPE into PLA lowered the rate of degradation or hydrolysis of PLA in vitro depending upon the amount of PFPE incorporated. PLA degraded at a faster rate in the PBS solution and hence % molecular weight remaining decreased significantly. The GPC overlay chromatograms (FIGS. 11B and 11C) show the eluent curves for PLA and 20 wt % PFPE/PLA copolymer samples aged in PBS solution for 42 to 70 days (specifically, 42d, 49d, 56d, 63d, and 70d, as marked). For PLA homopolymers, the eluent curves of aged samples are uniformly shifted towards higher elution time. However, in the case of the PFPE/PLA copolymer, the peaks of the curves for the aged samples were not distinctly separated indicating lower degree of hydrolysis or degradation.

It will be appreciated that the foregoing examples, given for purposes of illustration, are not to be construed as limiting the scope of this disclosure. Although only a few exemplary embodiments of the disclosed subject matter have been described in detail above, those skilled in the art will readily appreciate that many modifications are possible in the exemplary embodiments without materially departing from the novel teachings and advantages of this subject matter. Accordingly, all such modifications are intended to be included within the scope of this subject matter that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the disclosed subject matter.

What is claimed is:

1. A copolymer defining a polymer backbone, the polymer backbone comprising an aliphatic ester that is an open lactide ring, the polymer backbone further comprising an aliphatic fluorinated ether in an amount of from 1 wt. % to 20 wt. % of the copolymer.

2. The copolymer according to claim 1, wherein the aliphatic fluorinated ether is a perfluorinated ether.

3. The copolymer according to claim 2, wherein the copolymer has the structure:

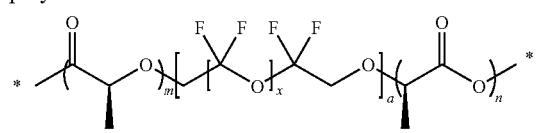

wherein:

m, x, a, and n≧1.

4. The copolymer according to claim 1, further comprising a second aliphatic fluorinated ether.

5. The copolymer according to claim 4, wherein the second aliphatic fluorinated ether is a perfluorinated ether.

6. The copolymer according to claim 5, wherein the copolymer has the structure:

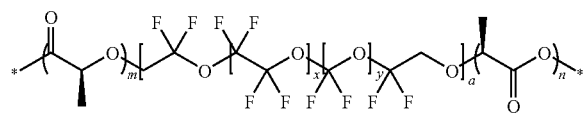

wherein:
x≧1;
Y≧1;
a≧1;
m≧1; and
n≧1.

7. The copolymer according to claim 1, wherein the copolymer defines a number average molecular weight of greater than about 3500.

8. The copolymer according to claim 1, wherein the copolymer defines a thermal denaturation temperature of greater than about 210° C.

9. The copolymer according to claim 1, wherein the copolymer defines a polydispersity between about 1.5 and about 3.5.

10. The copolymer according to claim 1, wherein the copolymer is an ABA triblock copolymer.

11. The copolymer according to claim 1, further comprising an aromatic moiety.

12. A formed polymeric material comprising a copolymer, the copolymer defining a polymer backbone, the polymer backbone including an aliphatic ester that is an open lactide ring, the polymer backbone further comprising an aliphatic fluorinated ether in an amount of from 1 wt. % to 20 wt. % of the copolymer.

13. The formed polymeric material according to claim 12, wherein the formed polymeric material is a film.

14. The formed polymeric material according to claim 12, wherein the formed polymeric material is a fiber.

15. The formed polymeric material according to claim 14, wherein the fiber is an electrospun fiber.

16. The formed polymeric material according to claim 15, wherein the electrospun fiber defines a diameter of less than about 5 micrometers.

17. The formed polymeric material according to claim 14, wherein the fiber is a monofilament fiber.

18. The formed polymeric material according to claim 12, wherein the formed polymeric material is a coating.

19. The formed polymeric material according to claim 12, wherein the formed polymeric material exhibits an elongation greater than about 100%.

20. The formed polymeric material according to claim 12, wherein the formed polymeric material exhibits a tensile stress greater than about 20 MPa.

* * * * *